United States Patent
Shin et al.

(10) Patent No.: US 11,662,577 B2
(45) Date of Patent: May 30, 2023

(54) ELECTRONIC DEVICE

(71) Applicant: LG ELECTRONICS INC., Seoul (KR)

(72) Inventors: Seungyong Shin, Seoul (KR); Dongyoung Lee, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 16/590,282

(22) Filed: Oct. 1, 2019

(65) Prior Publication Data
US 2021/0072535 A1    Mar. 11, 2021

(30) Foreign Application Priority Data
Sep. 11, 2019    (KR) .......................... 10-2019-0112967

(51) Int. Cl.
*G02B 27/01*    (2006.01)
*G02B 26/08*    (2006.01)
(Continued)

(52) U.S. Cl.
CPC ....... *G02B 27/0101* (2013.01); *G02B 26/004* (2013.01); *G02B 26/0875* (2013.01);
(Continued)

(58) Field of Classification Search
CPC ............ G02B 27/0101; G02B 27/0103; G02B 26/004; G02B 26/0875; G02B 2027/0118; G02B 2027/012; G02B 2027/0123; G02B 2027/0127; G02B 2027/0132; G02B 2027/0155; G02B 2027/0152; G02B 2027/0154; G02B 2027/0156;
(Continued)

(56) References Cited

U.S. PATENT DOCUMENTS

| | | | |
|---|---|---|---|
| 2019/0204600 | A1 | 7/2019 | Ha et al. |
| 2019/0204601 | A1 | 7/2019 | Ha et al. |

(Continued)

FOREIGN PATENT DOCUMENTS

| | | |
|---|---|---|
| KR | 1020150020801 | 2/2015 |
| KR | 1020180012057 | 2/2018 |
| KR | 1020180028339 | 3/2018 |

OTHER PUBLICATIONS

PCT International Application No. PCT/KR2019/012047, International Search Report dated Jun. 12, 2020, 4 pages.

*Primary Examiner* — Marin Pichler
(74) *Attorney, Agent, or Firm* — Lee, Hong, Degerman, Kang & Waimey PC

(57) ABSTRACT

To adjust the size or brightness of augmented reality information provided through an electronic device, the present disclosure provides an electronic device comprising an optical driving assembly including an image source panel for emitting image light, an optical element wherein the emitted image light is incident and totally reflected, a plurality of pin mirrors distributed in a region of the optical element and for deepening a depth of the image light reached, and a variable lens member provided at one point of an optical path before reaching the plurality of pin mirrors to vary a region where the image light reaches among the region where the plurality of pin mirrors are provided.

13 Claims, 20 Drawing Sheets

(a)

(b)

(51) Int. Cl.
*G02B 26/00* (2006.01)
*G06F 1/16* (2006.01)

(52) U.S. Cl.
CPC ......... *G02B 27/0103* (2013.01); *G06F 1/163* (2013.01); *G02B 2027/0118* (2013.01); *G02B 2027/0178* (2013.01)

(58) Field of Classification Search
CPC .... G02B 2027/0159; G02B 2027/0161; G02B 2027/0163; G02B 2027/0178; G02B 27/0172; G02B 27/0176; G02B 27/0149; G06F 1/163; G06F 3/011
USPC ...................................................... 359/226.3
See application file for complete search history.

(56) References Cited

U.S. PATENT DOCUMENTS

| | | | |
|---|---|---|---|
| 2020/0183169 A1* | 6/2020 | Peng | G02B 27/01 |
| 2020/0192181 A1* | 6/2020 | Kwon | G02F 1/31 |

\* cited by examiner (a)　　　　　　　　　　　　(b)

(a)

(b)

(c)

(d)

(e)

(f)

(a)

(b)

(c)

(d)

(a)

(b)

(c)

(d)

(a)

(b)

(c)

(a)

(b)

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0112967, filed on Sep. 11, 2019, the contents of which are hereby incorporated by reference herein in its entirety.

BACKGROUND OF THE INVENTION

Field of the Invention

The present disclosure relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

Such an electronic device is implemented through an optical driving assembly and a display. The optical driving assembly forms and provides image light corresponding to the content, and the display receives the image light thus formed and outputs the image light so that the user can see it.

The display is optically transparent to allow the user to visually recognize not only the output of the content corresponding to the image light of the optical driving assembly but also the real world located beyond the display.

At this time, the user may want information by varying the strengths of the augmented reality information and the real world information. For example, it may be desirable to check the content information in a smaller size relative to the image of the real world, or conversely, it may be desirable to check the content information in a large size as main information.

In addition, it may be needed to adjust the brightness of the content information. For example, it is preferable that the content information is also brightly provided when there is a lot of ambient light outdoors, while the content information is also provided relatively less brightly when there is a relatively low amount of ambient light indoors.

However, the electronic device of the related art has a problem that such a selective output adjustment is not easy.

SUMMARY OF THE INVENTION

The present disclosure provides an electronic device used for Virtual Reality (VR), Augmented Reality (AR), and Mixed Reality (MR).

The present disclosure is to solve the problem that it is not possible to selectively adjust the size or brightness of the augmented reality information in the electronic device that provides the real world and augmented reality information as described above.

According to an aspect of the present disclosure to achieve the above or another object, an electronic device comprising an optical driving assembly including an image source panel for emitting image light, an optical element in which the emitted image light is incident and totally reflected, a plurality of pin mirrors distributed in a region of the optical element and configured to extend a depth of field and a variable lens member provided at one point of an optical path before reaching the plurality of pin mirrors to vary a region where the image light reaches among the region where the plurality of pin mirrors are provided is provided.

Further, according to another aspect of the present disclosure, the electronic device wherein the variable lens member includes a plurality of lens members and a lens moving assembly configured to move the plurality of lens members such that each lens member of the plurality of lens members is selectively positioned at a first point on an optical path reaching the plurality of pin mirrors from the image source panel is provided.

Further, according to another aspect of the present disclosure, the electronic device further comprising a lens case configured to mount the plurality of lens members, wherein the lens moving assembly includes a rail formed in the lens case and a guider fixed to the optical element to form a path along which the rail moves is provided.

Further, according to another aspect of the present disclosure, the electronic device wherein the guider is provided in a straight direction parallel to one surface of the optical element is provided.

Further, according to another aspect of the present disclosure, the electronic device further comprising a panel case configured to mount the image source panel and a panel distance adjusting assembly configured to move such that the optical path length from the panel case to the plurality of pin mirrors becomes different according to a movement of the lens case is provided.

Further, according to another aspect of the present disclosure, the electronic device wherein the panel distance adjusting assembly includes a slit provided in the lens case to form an inclination with respect to a direction of the guider, a protuberance provided on the panel case and fastened to be movable on the slit and a support member configured to prevent the panel case from moving in a direction of the movement of the lens case when the lens case moves is provided.

Further, according to another aspect of the present disclosure, the electronic device wherein the lens moving assembly further includes an actuator configured to move the plurality of lens members by rotation of a motor or solenoid drive is provided.

Further, according to another aspect of the present disclosure, the electronic device further comprising an illuminance sensor configured to measuring ambient illuminance and a controller configured to control the actuator such that the variable lens member is adjusted to narrow the region where the image light reaches if the ambient illuminance measured by the illuminance sensor is high, and the variable lens member is adjusted to widen the region where the image light reaches if the ambient illuminance measured by the illuminance sensor is low is provided.

Further, according to another aspect of the present disclosure, the electronic device further comprising a plurality of lens members selectively positioned on a first point on a light path between the optical element and the optical driving assembly, wherein the plurality of lens members are composed of any one of a refractive lens and a diffraction element is provided.

Further, according to another aspect of the present disclosure, the electronic device wherein the variable lens member is a tunable lens including a liquid lens or an electrowetting lens having a variable refractive index is provided.

Further, according to another aspect of the present disclosure, the electronic device wherein the plurality of pin mirrors form a grid pattern, and intersecting band regions among the grid pattern form a reflective region is provided.

Further, according to another aspect of the present disclosure, the electronic device wherein the plurality of pin mirrors form a grid pattern, and regions inside the grid among the grid pattern form a reflective region is provided.

Further, according to another aspect of the present disclosure, the electronic device wherein the region where the plurality of pin mirrors are provided and a maximum region where the image light reaches by the variable lens member coincide with each other is provided.

DESCRIPTION OF EXEMPLARY EMBODIMENTS

Figure 1:
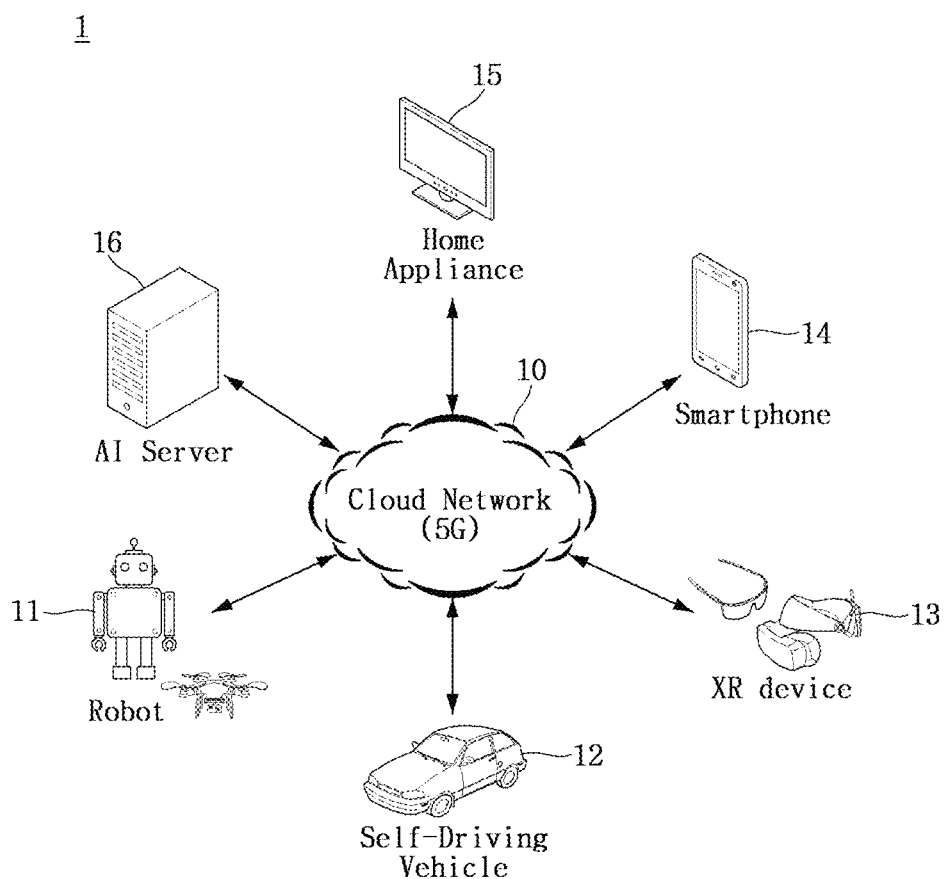
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

Figure 2:
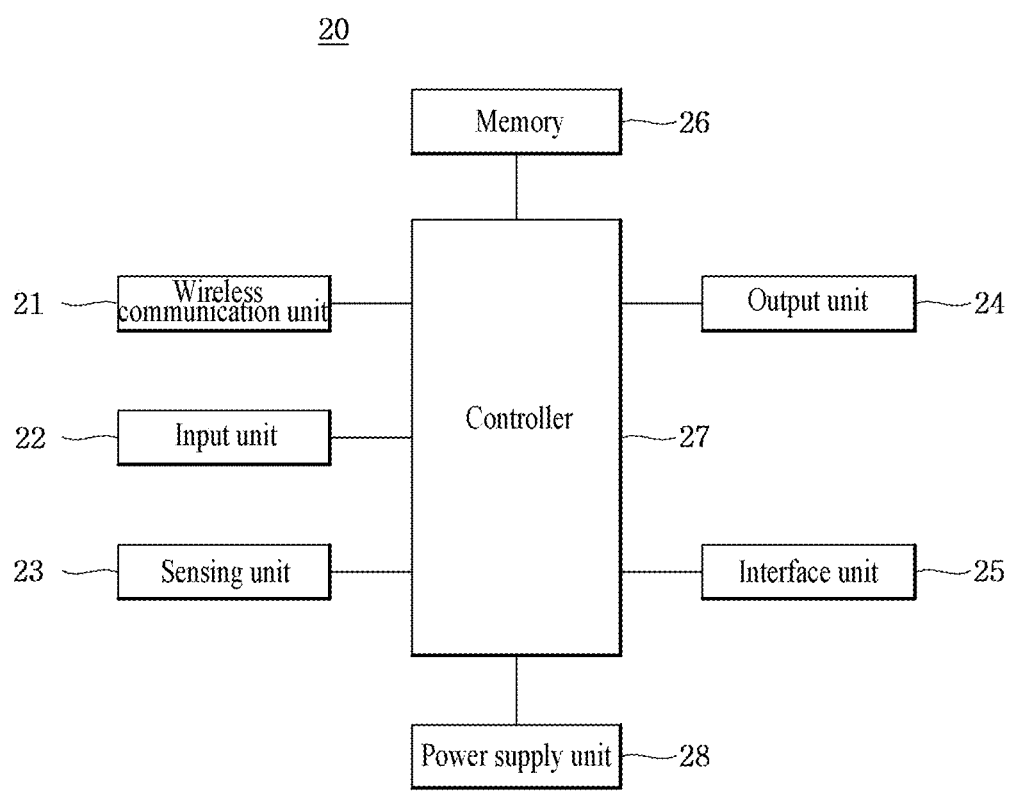
FIG. 2 is a block diagram illustrating the structure of an eXtended Reality (XR) electronic device according to one embodiment of the present disclosure.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display, sound output unit, haptic module, and optical output unit. The display may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
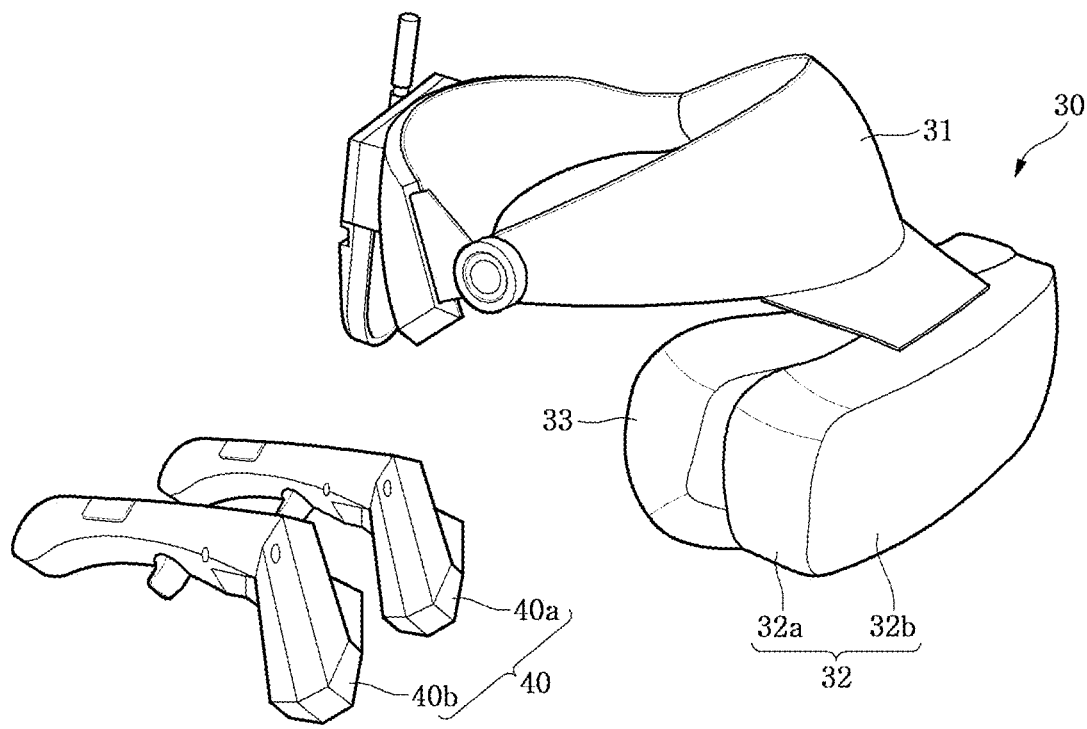
FIG. 3 is a perspective view of a VR electronic device according to one embodiment of the present disclosure.
Figure 4:
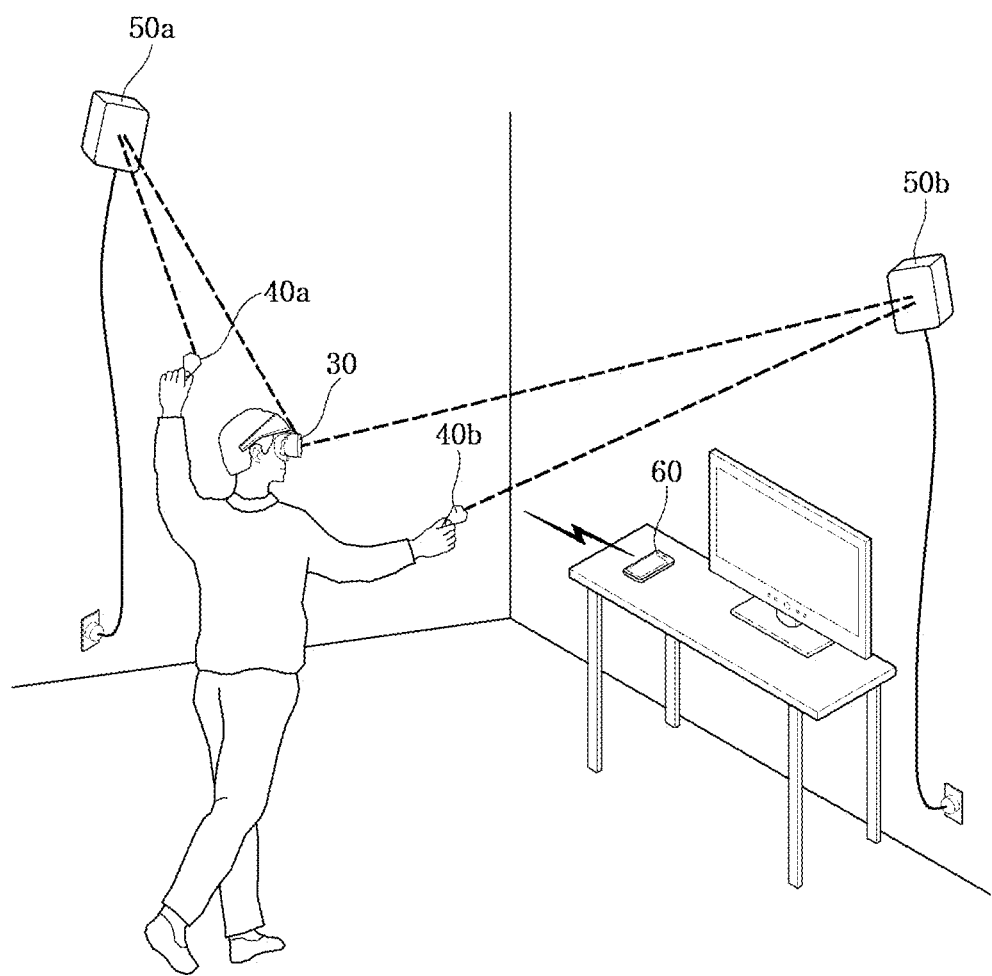
FIG. 4 illustrates a situation in which the VR electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display 32 being combined with the head unit 31 and displaying a virtual image or video in front of the user's eyes. Although the figure shows that the head unit 31 and display 32 are made as separate units and combined together, the display 32 may also be formed being integrated into the head unit 31.

The head unit 31 may assume a structure of enclosing the head of the user so as to disperse the weight of the display 32. And to accommodate different head sizes of users, the head unit 31 may provide a band of variable length.

The display 32 includes a cover unit 32a combined with the head unit 31 and a display 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display 32b is installed on the front surface frame of the cover unit 32a and disposed at the position corresponding to the eyes of the user to display screen information (image or video). The screen information output on the display 32b includes not only VR content but also external images collected through an image capture means such as a camera.

And VR content displayed on the display 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display 32b.

The display 32b may include a display panel installed at the front of the opening of the cover unit 32a, where the display panel may be an LCD or OLED panel. Similarly, the display 32b may be a display of a smartphone. In other words, the display 32b may have a specific structure in which a smartphone may be attached to or detached from the front of the cover unit 32a.

And an image capture means and various types of sensors may be installed at the front of the display 32.

The image capture means (for example, camera) is formed to capture (receive or input) the image of the front and may obtain a real world as seen by the user as an image. One image capture means may be installed at the center of the display 32b, or two or more of them may be installed at symmetric positions. When a plurality of image capture means are installed, a stereoscopic image may be obtained. An image combining an external image obtained from an image capture means with a virtual image may be displayed through the display 32b.

Various types of sensors may include a gyroscope sensor, motion sensor, or IR sensor. Various types of sensors will be described in more detail later.

At the rear of the display 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
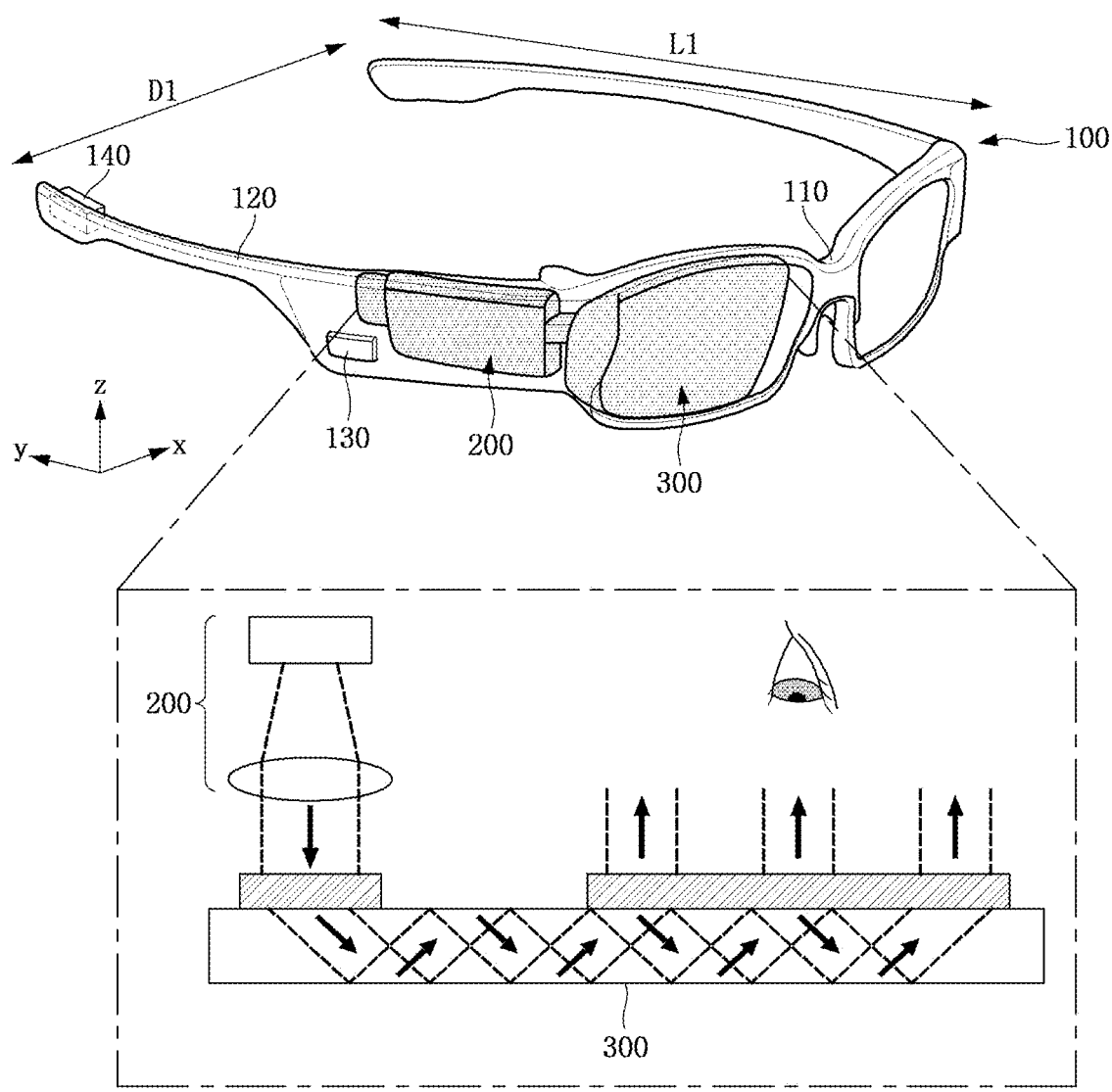
FIG. 5 is a perspective view of an AR electronic device according to one embodiment of the present disclosure.

FIG. 5 is a perspective view of an AR electronic device according to one embodiment of the present disclosure.

As shown in FIG. 5, the electronic device according to one embodiment of the present disclosure may include a frame 100, controller 200, and display 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display 300 may be implemented in the form of a Head Mounted Display (HMD). HMD refers to a particular type of display device worn on the head and showing an image directly in front of eyes of the user. The display 300 may be disposed to correspond to at least one of left and right eyes so that images may be shown directly in front of the eye(s) of the user when the user wears the electronic device. The present figure illustrates a case where the display 300 is disposed at the position corresponding to the right eye of the user so that images may be shown before the right eye of the user.

The display 300 may be used so that an image generated by the controller 200 is shown to the user while the user visually recognizes the external environment. For example, the display 300 may project an image on the display area by using a prism.

And the display 300 may be formed to be transparent so that a projected image and a normal view (the visible part of the world as seen through the eyes of the user) in the front are shown at the same time. For example, the display 300 may be translucent and made of optical elements including glass.

And the display 300 may be fixed by being inserted into the opening included in the front frame 110 or may be fixed on the front surface 110 by being positioned on the rear surface of the opening (namely between the opening and the user's eye). Although the figure illustrates one example where the display 300 is fixed on the front surface 110 by being positioned on the rear surface of the rear surface, the display 300 may be disposed and fixed at various positions of the frame 100.

As shown in FIG. 5, the electronic device may operate so that if the controller 200 projects light about an image onto one side of the display 300, the light is emitted to the other side of the display, and the image generated by the controller 200 is shown to the user.

Accordingly, the user may see the image generated by the controller 200 while seeing the external environment simultaneously through the opening of the frame 100. In other words, the image output through the display 300 may be seen by being overlapped with a normal view. By using the display characteristic described above, the electronic device may provide an AR experience which shows a virtual image overlapped with a real image or background as a single, interwoven image.

Figure 6:
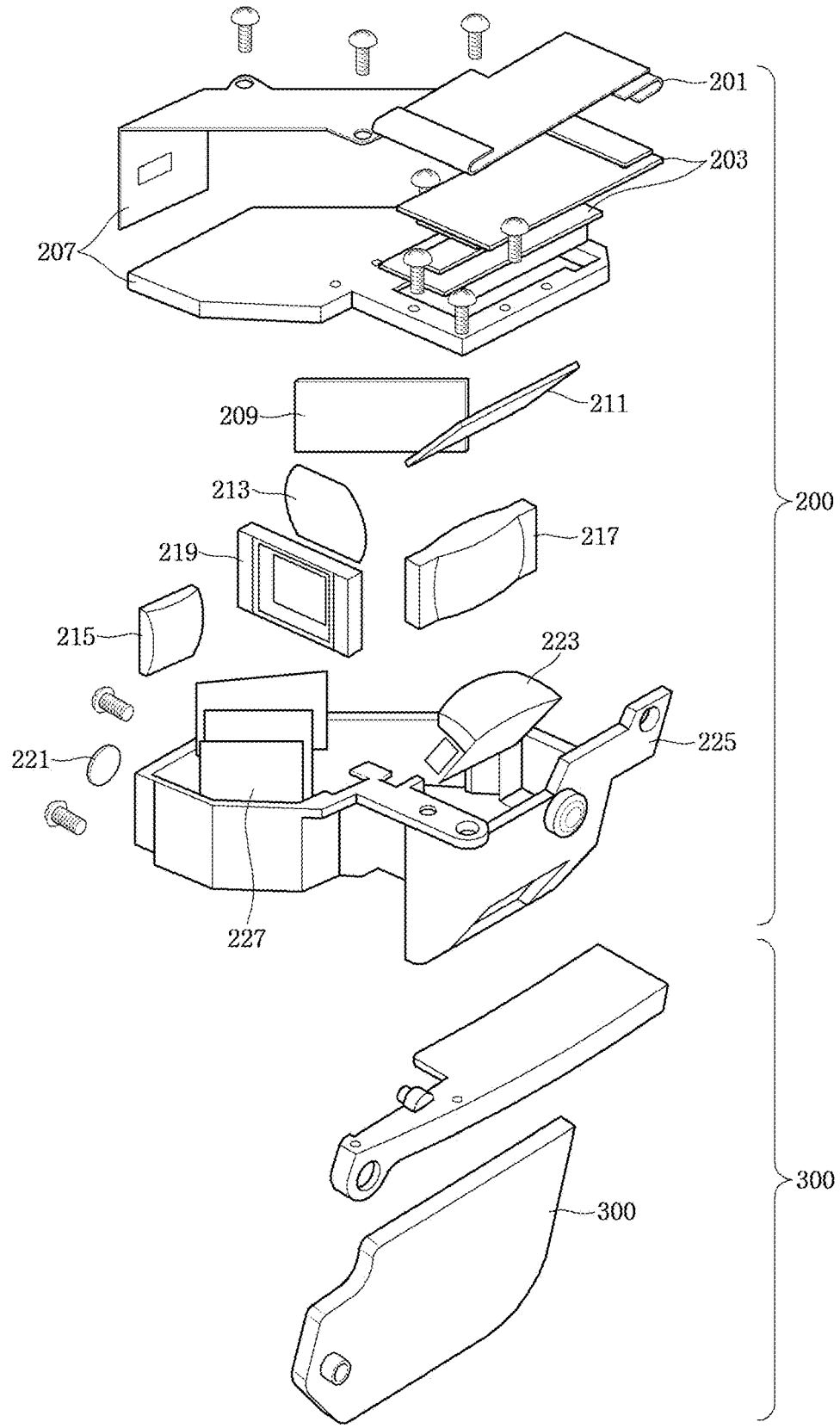
FIG. 6 is an exploded perspective view of a optical driving assembly according to one embodiment of the present disclosure.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display 300.

The display 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display 300 and various methods for emitting incident image light rays will be described.

FIGS. 7 to 13 illustrate various display methods applicable to the display 300 according to one embodiment of the present disclosure.

Figure 7:
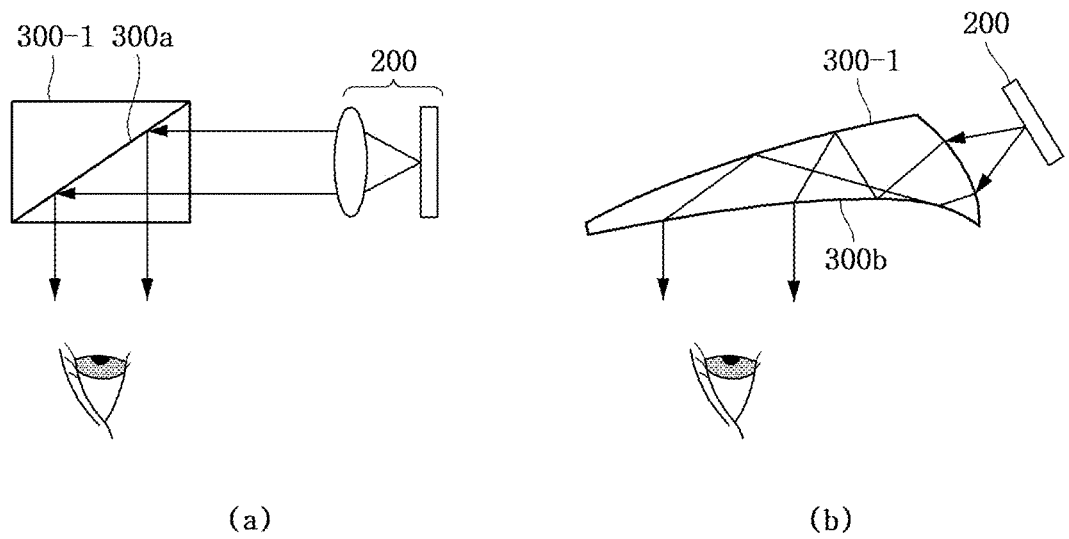
FIGS. 7a-b, 8a-f, 9a-d, 10a-d, 11a-c, 12 and 13 illustrate various display methods applicable to a display according to one embodiment of the present disclosure.
Figure 8:
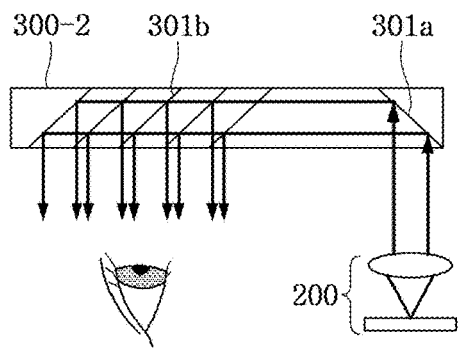
Figure 8:
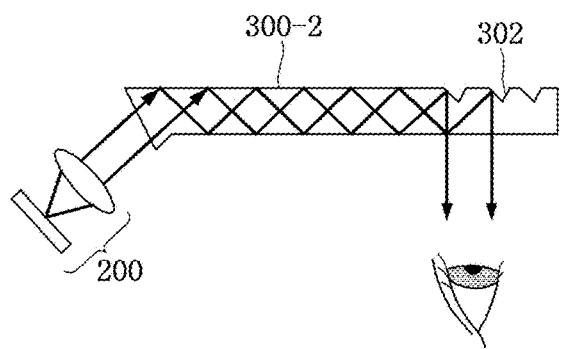
Figure 8:
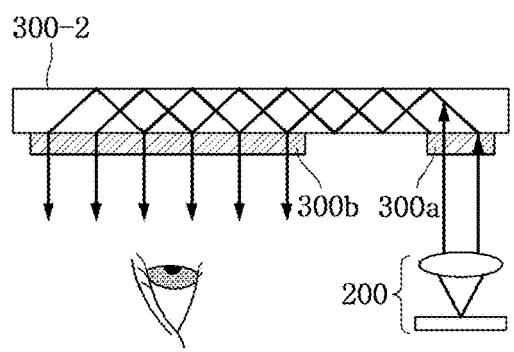
Figure 8:
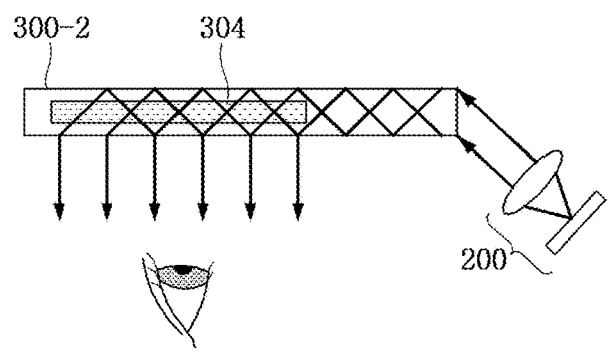
Figure 8:
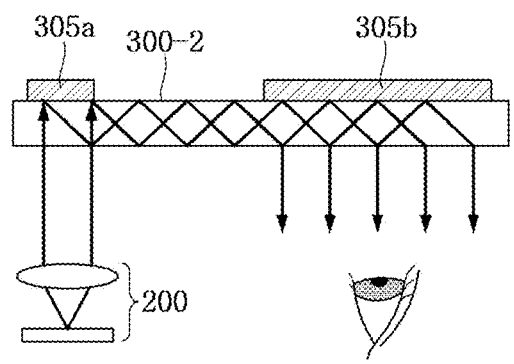
Figure 8:
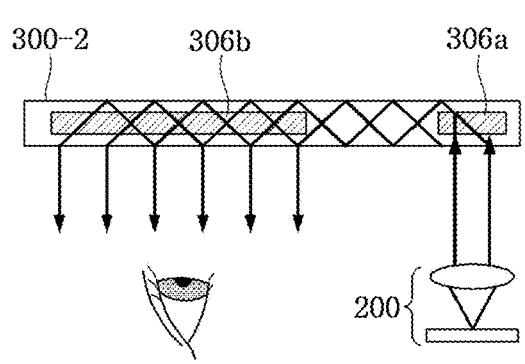
Figure 9:
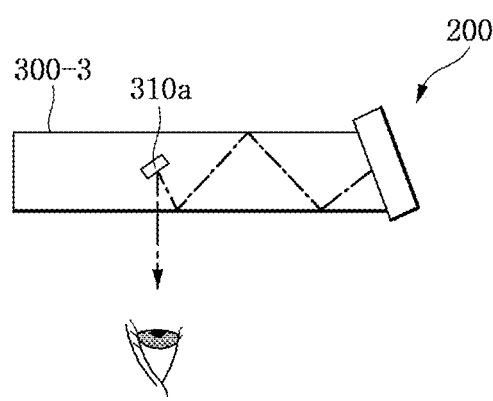
Figure 9:
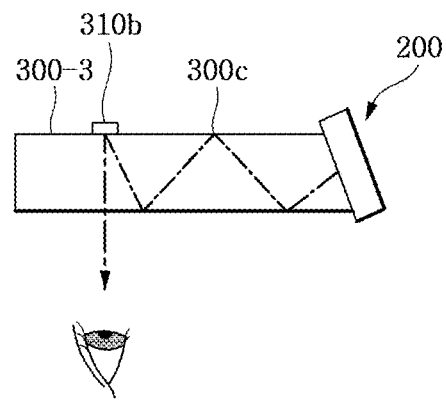
Figure 9:
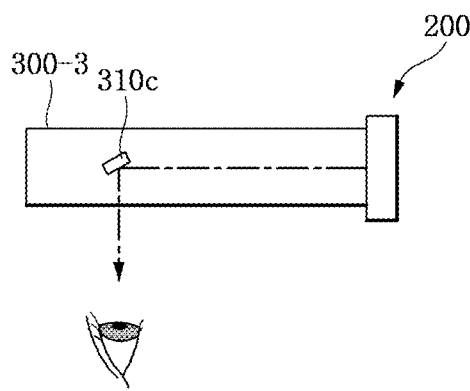
Figure 9:
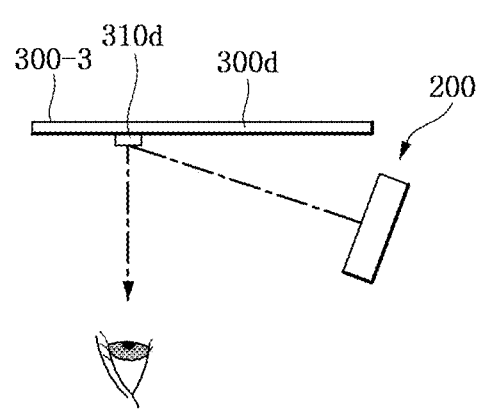
Figure 10:
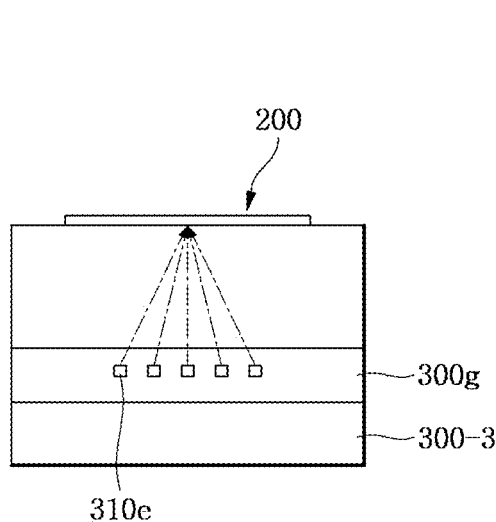
Figure 10:
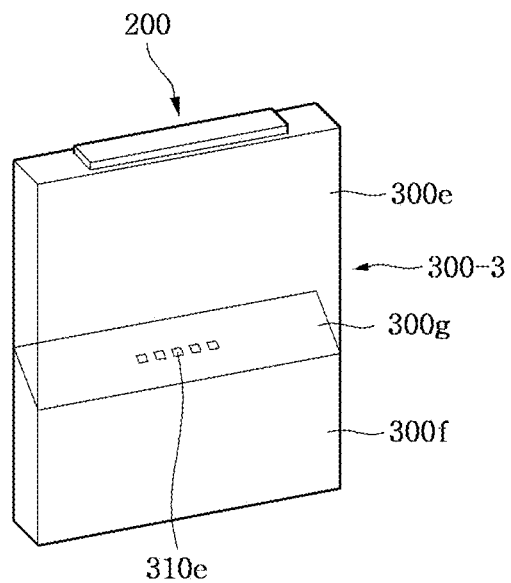
Figure 10:
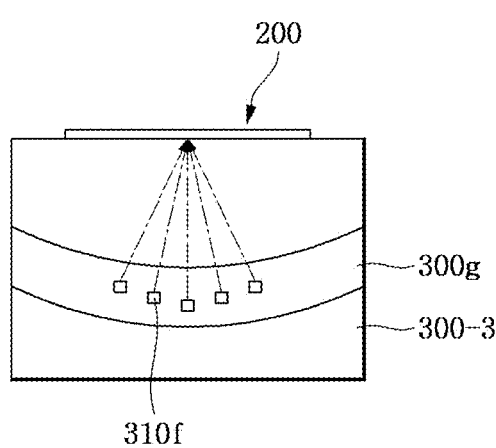
Figure 10:
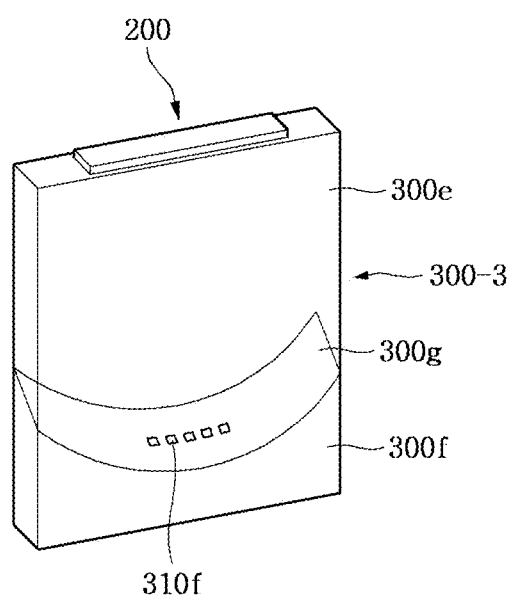
Figure 11:
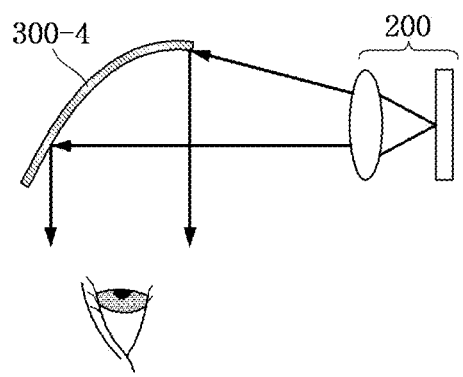
Figure 11:
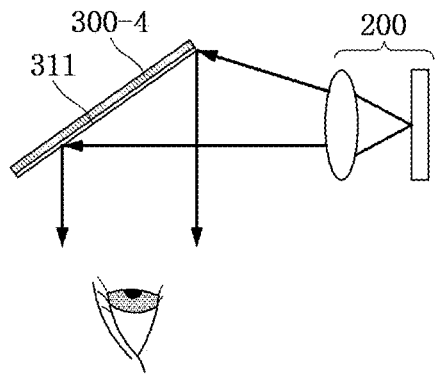
Figure 11:
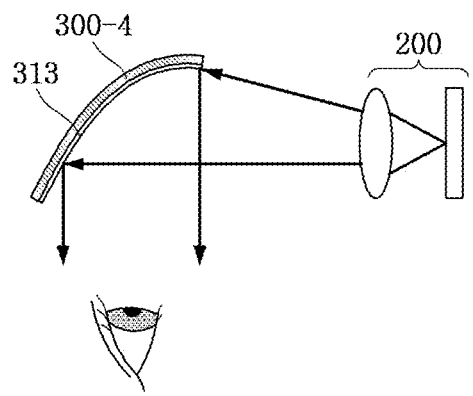
Figure 12:
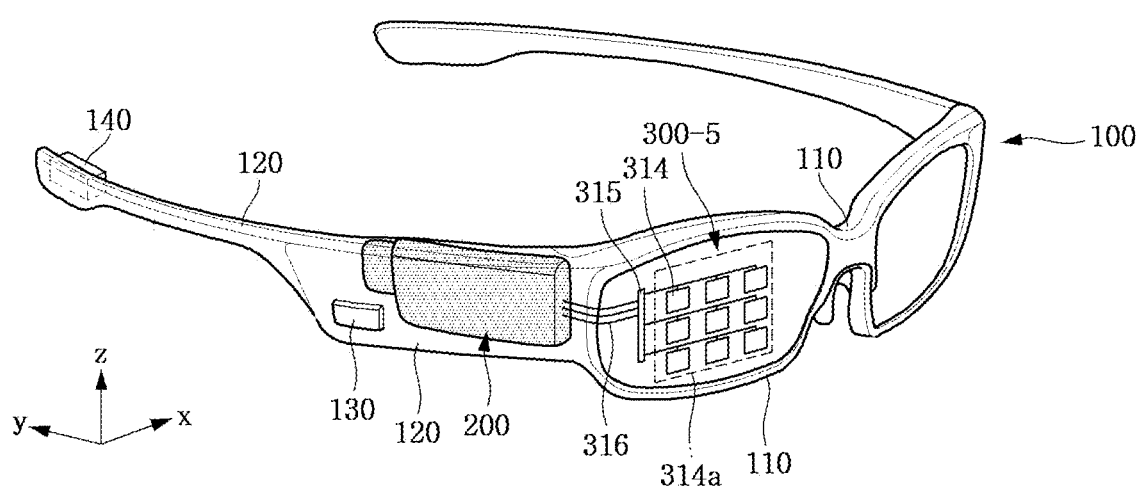
Figure 13:
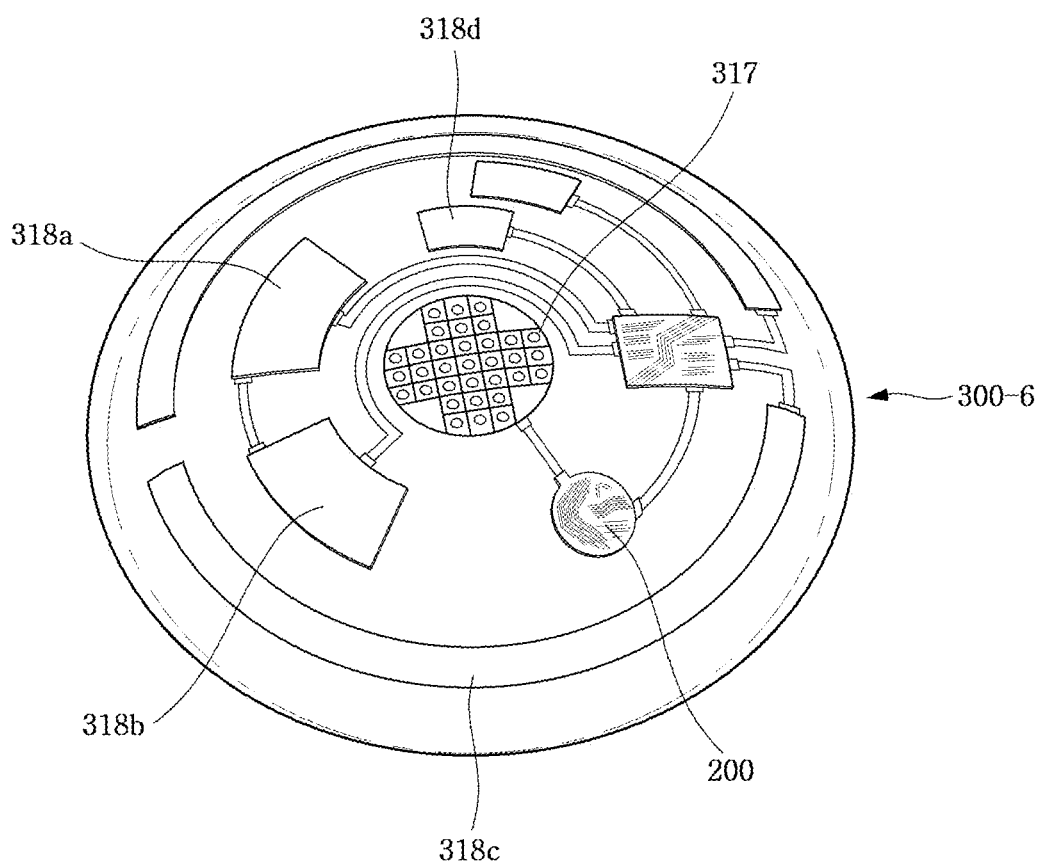

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display used for contact lenses.

As shown in FIG. 7, the display 300-1 according to one embodiment of the present disclosure may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction member 303a on the surface of the part on which the optical image is incident and a second diffraction member 303b on the surface of the part from which the optical image is emitted. The first and second diffraction members 303a, 303b may be provided in a way that a specific pattern is patterned on the surface of the glass or a separate diffraction film is attached thereon.

Accordingly, the optical image generated by the controller 200 is diffracted as it is incident through the first diffraction member 303a, guided along the longitudinal direction of the glass while being totally reflected, emitted through the second diffraction member 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display 300-3 according to another embodiment of the present disclosure may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole extends the depth of field (DOF), which makes the image formed on the retina more vivid.

In what follows, an embodiment for using a pin mirror-type optical element will be described with reference to FIGS. 9 and 10.

Referring to FIG. 9(a), the pinhole mirror 310a may be provided on the path of incident light within the display 300-3 and reflect the incident light toward the user's eye. More specifically, the pinhole mirror 310a may be disposed between the front surface (outer surface) and the rear surface (inner surface) of the display 300-3, and a method for manufacturing the pinhole mirror will be described again later.

The pinhole mirror 310a may be formed to be smaller than the pupil of the eye and to provide an extended depth of field. Therefore, even if the focal length for viewing a real world through the display 300-3 is changed, the user may still clearly see the real world by overlapping an augmented reality image provided by the controller 200 with the image of the real world.

And the display 300-3 may provide a path which guides the incident light to the pinhole mirror 310a through internal total reflection.

Referring to FIG. 9(b), the pinhole mirror 310b may be provided on the surface 300c through which light is totally reflected in the display 300-3. Here, the pinhole mirror 310b may have the characteristic of a prism that changes the path of external light according to the user's eyes. For example, the pinhole mirror 310b may be fabricated as film-type and attached to the display 300-3, in which case the process for manufacturing the pinhole mirror is made easy.

The display 300-3 may guide the incident light incoming from the controller 200 through internal total reflection, the light incident by total reflection may be reflected by the pinhole mirror 310b installed on the surface on which external light is incident, and the reflected light may pass through the display 300-3 to reach the user's eyes.

Referring to FIG. 9(c), the incident light illuminated by the controller 200 may be reflected by the pinhole mirror 310c directly without internal total reflection within the display 300-3 and reach the user's eyes. This structure is convenient for the manufacturing process in that augmented reality may be provided irrespective of the shape of the surface through which external light passes within the display 300-3.

Referring to FIG. 9(d), the light illuminated by the controller 200 may reach the user's eyes by being reflected within the display 300-3 by the pinhole mirror 310d installed on the surface 300d from which external light is emitted. The controller 200 is configured to illuminate light at the position separated from the surface of the display 300-3 in the direction of the rear surface and illuminate light toward the surface 300d from which external light is emitted within the display 300-3. The present embodiment may be applied easily when thickness of the display 300-3 is not sufficient to accommodate the light illuminated by the controller 200. Also, the present embodiment may be advantageous for manufacturing in that it may be applied irrespective of the surface shape of the display 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display 300-3 to compensate for the path difference of the light reflected from the plurality of pinhole mirrors 310e disposed side by side in a row.

The surface reflection-type optical element that may be applied to the display 300-4 according to another embodiment of the present disclosure may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display 300-5 employing micro LED as shown in FIG. 12 and a display 300-6 employing a contact lens as shown in FIG. 13 may also be used.

Referring to FIG. 12, the optical element of the display 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display 300-5 along a conductive input line 316, and the display 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display 300-5. And the plurality of optical elements 314 may be disposed on a transparent substrate.

The image signal generated by the controller 200 is sent to an image split circuit 315 provided at one side of the display 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display 300 according to one embodiment of the present disclosure may include a retina scan method.

Figure 14:
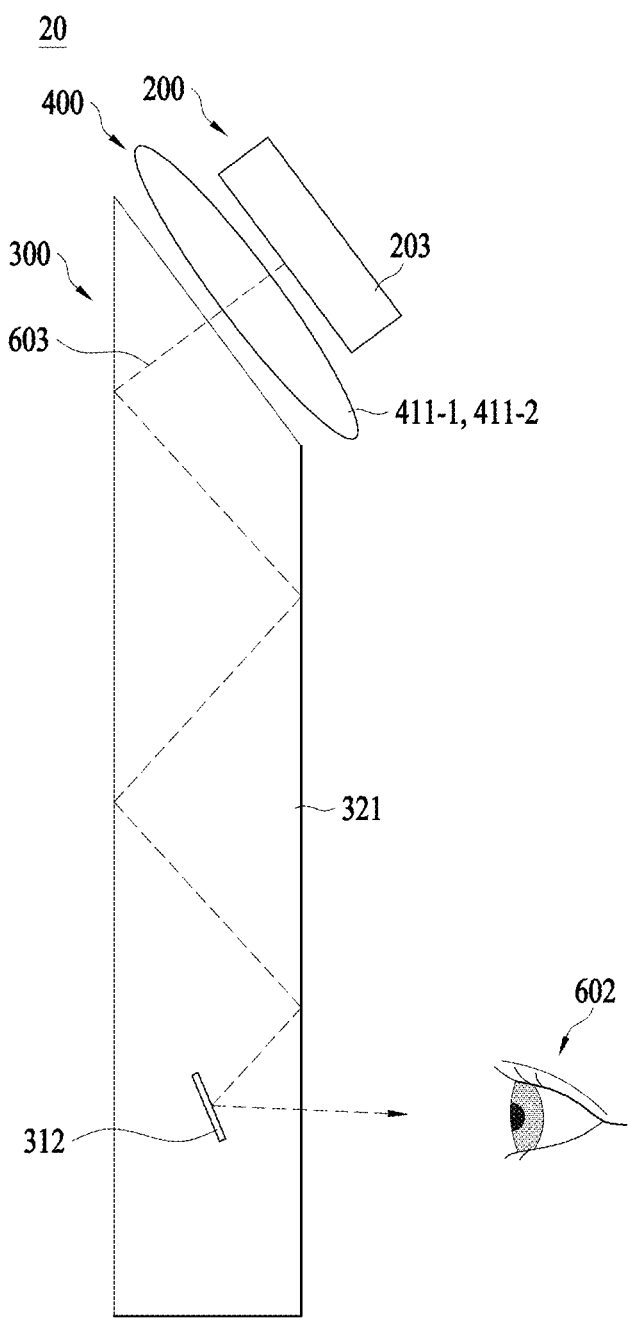
FIG. 14 is a side conceptual view of an electronic device associated with the present disclosure.
Figure 15:
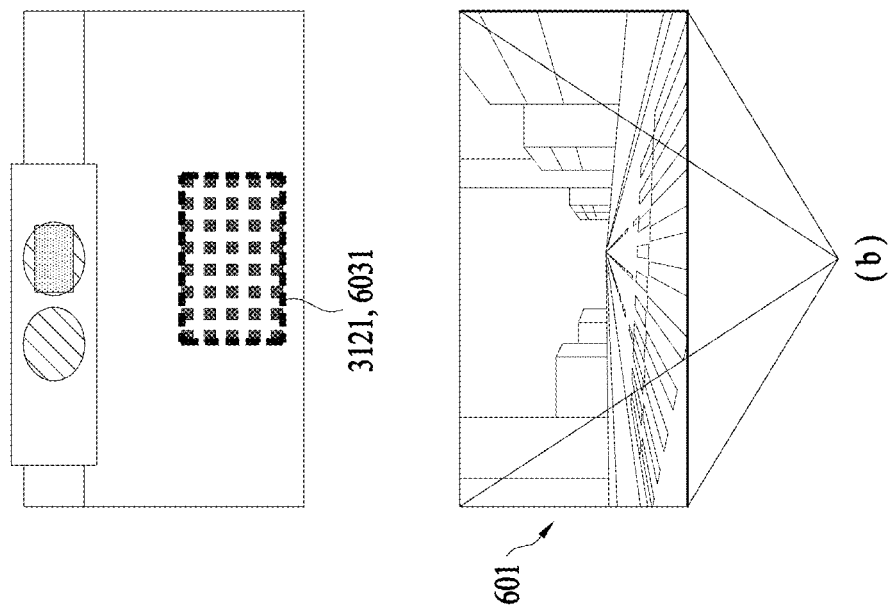
FIGS. 15a-b illustrate front conceptual views of two states of the electronic device associated with the present disclosure.
Figure 15:
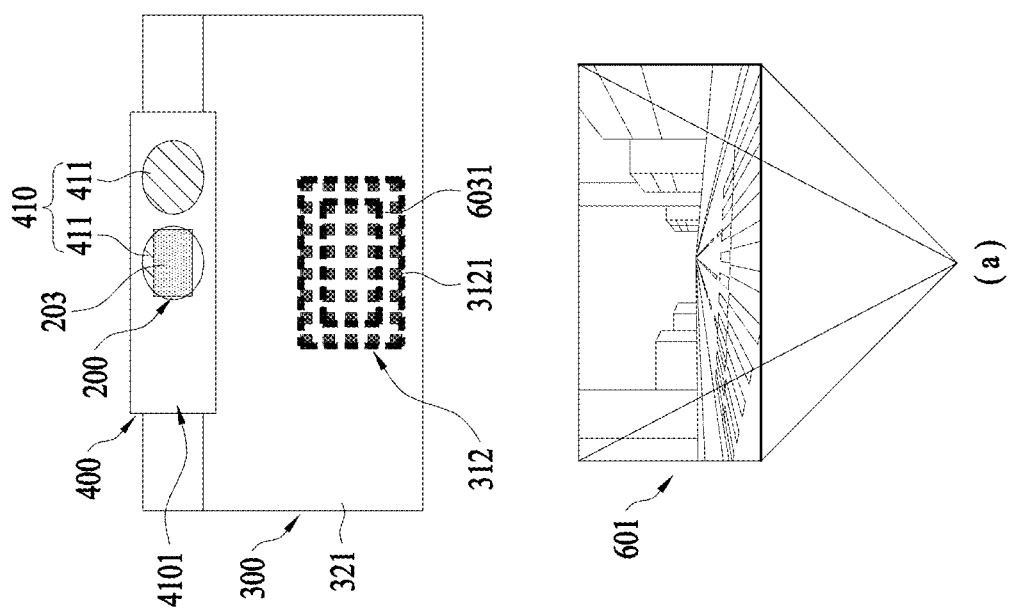

FIG. 14 is a side conceptual view of an electronic device 20 associated with the present disclosure, and FIG. 15 illustrates front conceptual views of two states of the electronic device 20 associated with the present disclosure.

In the state in which a user wears electronic device 20 providing augmented reality information, it is defined that a surface seen by the user is a front surface and a direction from the user upward is an upward direction.

Electronic device 20 of the present disclosure includes an optical driving assembly 200, an optical element 321, and a pin mirror 312.

Optical driving assembly 200 emits image light 603 corresponding to the augmented reality information. More specifically, optical driving assembly 200 includes an image source panel 203, and image source panel 203 emits the image light 603 corresponding to the augmented reality information to be output by display 300 directly.

Optical element 321 is a part of display 300, and serves to provide a path for image light 603 emitted from optical driving assembly 200 to be totally reflected after incidence to reach an eye 602 of the user. Optical element 321 may include an optically transparent material such as a photopolymer.

A pin mirror 312 is distributed in one region of optical element 321, reflects image light 603 to reach the user, and extends the depth of field at this time.

In summary, image light 603 is formed and emitted from optical driving assembly 200, incident and totally reflected by optical element 321, and reflected by pin mirror 312 of optical element 321 to be provided to the user. Display 300 (or optical element 321) totally reflects image light 603 so that optical driving assembly 200 does not block the user's vision, and pin mirror 312 extends the depth of field to make clear images to the user.

For more detailed description of optical driving assembly 200, optical element 321, and pin mirror 312, FIGS. 9 and 10 may be referred to. Pin mirror 312 means a configuration that serves as a mirror among the above-described pin hole mirror.

Pin mirror 312 may be provided in plural. Plurality of pin mirrors 312 may provide the user with a plurality of image lights 603 causing an extended depth of field based on the principle of emission pupil duplication, so that the augmented reality information may be more clearly output than when provided in singular.

A variable lens member 400 varies a region 6031 (or dimension of a region 6031) to which image light 603 from optical driving assembly 200 arrives among regions 3121 provided with plurality of pin mirrors 312. The meaning of region 3121 provided with plurality of pin mirrors 312 refers to a region where a line connecting plurality of pin mirrors 312 positioned on the outer side among plurality of pin mirrors 312 becomes an outer boundary.

Variable lens member 400 changes area 601 that is output as augmented reality information by adjusting the refractive index and the like to adjust an effective region 6031 of image light 603 that is reaching plurality of pin mirrors 312. The larger region 6031 reaching, the larger area 601 of the augmented reality information that is output. The user may use electronic device 20 by adjusting output area 601 of the augmented reality information to be larger or smaller.

Alternatively, the brightness of the augmented reality information that is output by variable lens member 400 may also be adjusted. Assuming that the amount of light reaching pin mirror 312 from optical driving assembly 200 is the same even though reaching region 6031 is varied by variable lens member 400, the brightness density decreases to form a blurry image if image light 603 arrives in a wide region among the region of plurality of pin mirror 312. Meanwhile, the brightness density increases to form a clear image if image light 603 reaches a relatively narrow region. Such an adjustment of the brightness may be helpfully applied when there is a difference in external illuminance of electronic device 20. If the external illuminance is high (for example, when electronic device 20 is outdoors), the augmented reality information also needs to be provided at a high brightness. In contrast, if it is indoors, the augmented reality information may also be provided at a low brightness because the amount of external light is usually low.

Variable lens member 400 is provided at a first point on an optical path that reaches plurality of pin mirrors 312 from optical driving assembly 200. However, the entire variable lens member 400 does not always need to be located in the optical path. In particular, it is preferable that variable lens member 400 is provided between optical driving assembly 200 and display 300 (or optical element 321). Because variable lens member 400 is physically changed, it is not appropriate to be positioned inside optical element 321 that is not.

Variable lens member 400 may include a plurality of lens members 410. Each lens member 411 adjusts regions 6031 of the image light reaching plurality of pin mirrors 312 to be different with different refractive indices. Plurality of lens members 410 may consist of at least two lens members 411.

Plurality of lens members 410 may be any one of a refractive lens (or a lens group) 411-1 and a diffraction element (DOE) 411-2. All lens members 411 of plurality of lens members 410 may be configured as refractive lenses 411-1 or diffraction elements 411-2. In some cases, some lens members 410 may be implemented as refractive lenses, and other lens members may be implemented as diffractive elements.

Each lens member 411 of plurality of lens members 410 may be moved to be selectively positioned at a first point on an optical path reaching plurality of pin mirrors 312 from image source panel 203. Movement of plurality of lens members 410 may be implemented by a lens moving assembly. The mechanism of the lens moving assembly will be described later.

Figure 16:
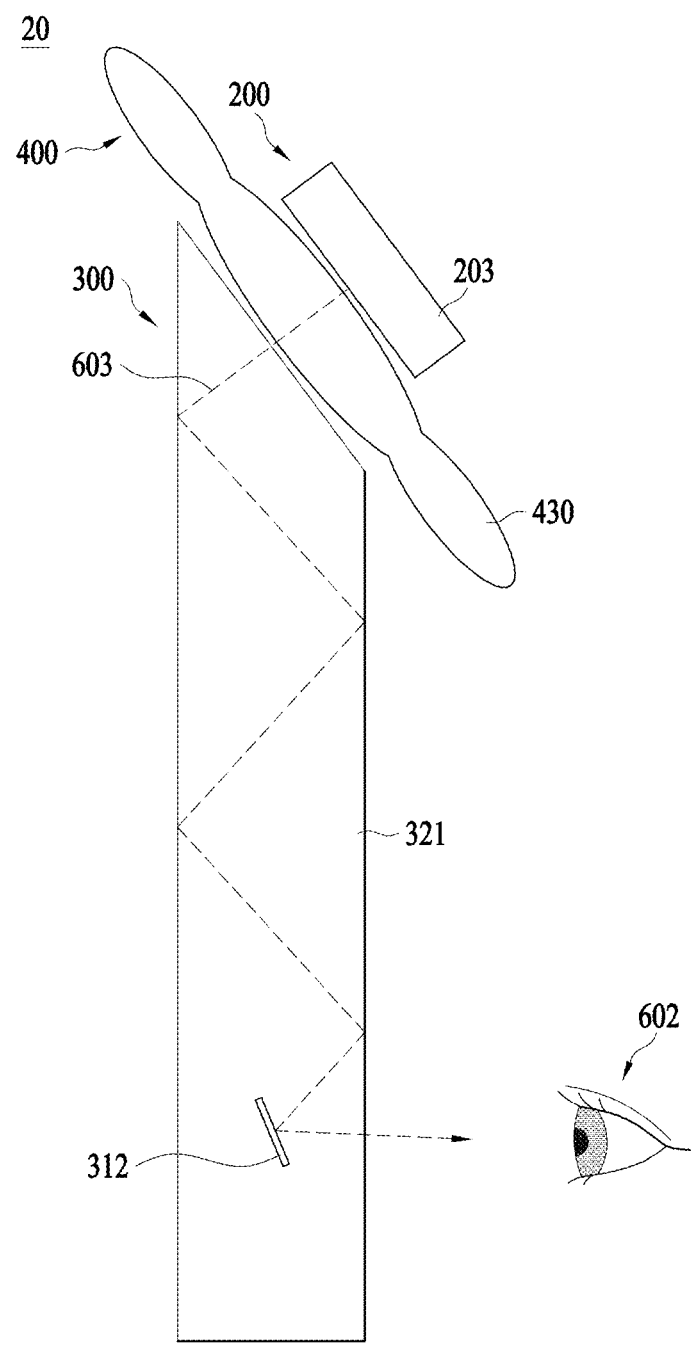
FIG. 16 is a side conceptual view of another embodiment of an electronic device associated with the present disclosure.

FIG. 16 is a side conceptual view of another embodiment of an electronic device 20 associated with the present disclosure.

Variable lens member 400 may include a tunable lens 430. Here, tunable lens 430 may be a liquid lens or an electro wetting lens having a variable refractive index. Tunable lens 430 refers to a configuration in which the refractive index is changed through deformation of a shape without moving, unlike a refractive lens or a diffraction element provided in the form of plurality of lens members 410. Unlike refractive lenses or diffractive elements, there is an advantage in that refractive index is finely adjustable, and it can be applied to a narrow space due to its relatively small size.

Descriptions with respect to FIGS. 14 and 15 may be equally applicable to the exemplary embodiment of FIG. 16 within the scope that does not contradict, and thus repetitive descriptions thereof will be omitted.

In the embodiments of FIGS. 14 to 16, the maximum region of image light 603 that reaches the plurality of mirrors through variable lens member 400 is made to coincide with the region provided with plurality of pin mirrors 312 so that unused pin mirror 312 can be prevented from being provided. When unused pin mirror 312 is provided, there is a problem such as an increase in cost due to redundant pin mirror 312, obstruction of view, and so on.

Plurality of pin mirrors 312 may form a rectangular boundary. It is preferable that the rectangular aspect ratio matches the aspect ratio of image source panel 203 so that unused pin mirror 312 does not occur.

Figure 17:
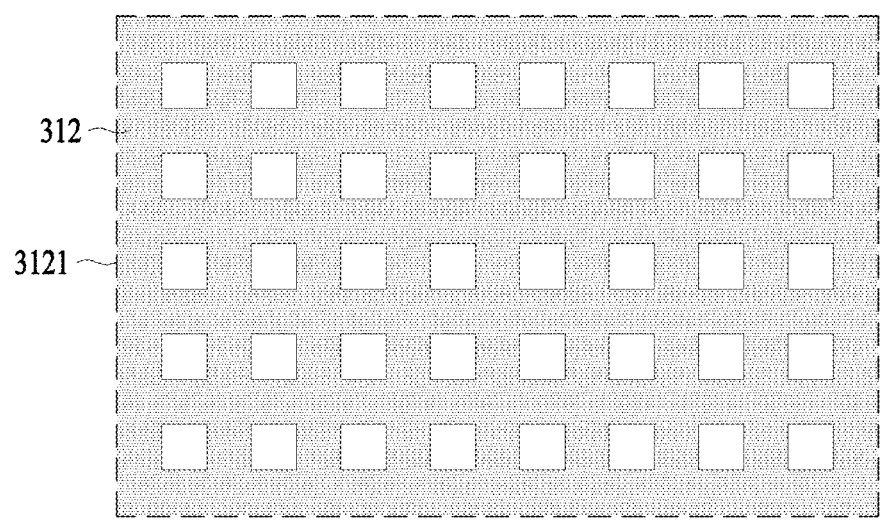
FIGS. 17 and 18 relate to two embodiments in which a part of the optical element of the present disclosure is viewed from the front.
Figure 18:
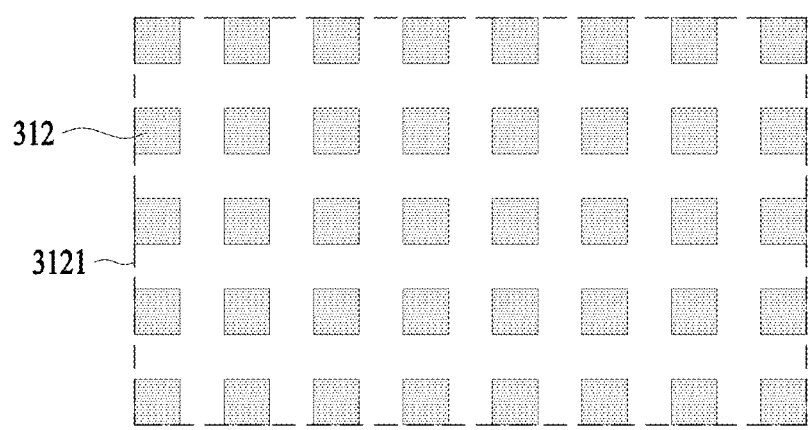

FIGS. 17 and 18 relate to two embodiments in which a part of the optical element 321 of the present disclosure is viewed from the front.

Plurality of pin mirrors 312 may form a grid pattern.

Referring to FIG. 17, plurality of pin mirrors 312 may be implemented in a negative type in which intersecting band regions among the grid pattern form a reflective region. The grid pattern may be implemented as a combination of a pattern in which a plurality of bands formed in a vertical direction are arranged in a horizontal direction and a pattern in which a plurality of bands formed in a horizontal direction are arranged in a vertical direction.

Alternatively, as shown in FIG. 18, plurality of pin mirrors 312 may be implemented in a positive type in which regions inside the grid among the grid pattern form a reflective region.

Figure 19:
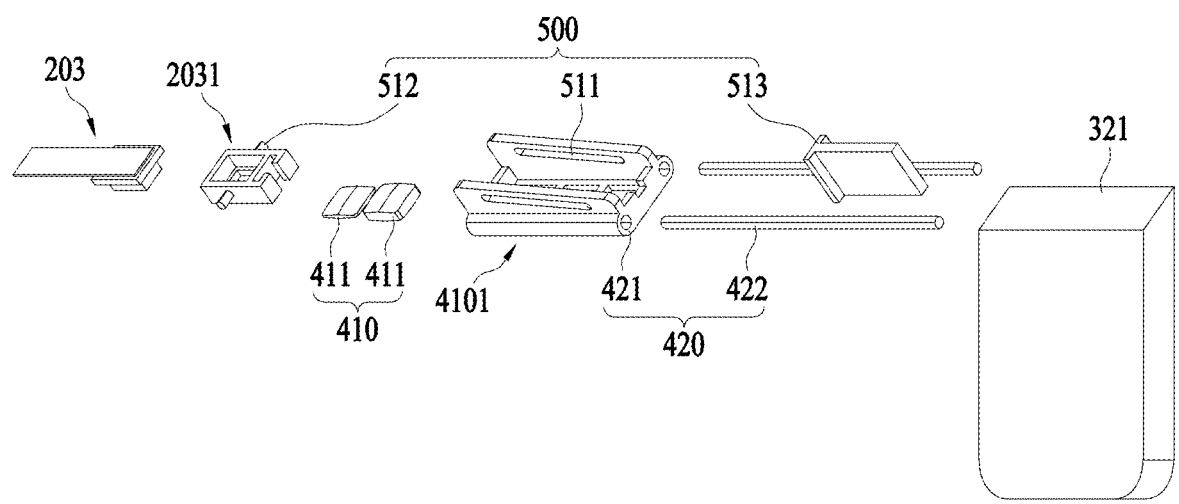
FIG. 19 illustrates a state before coupling some components of an electronic device associated with the present disclosure.
Figure 20:
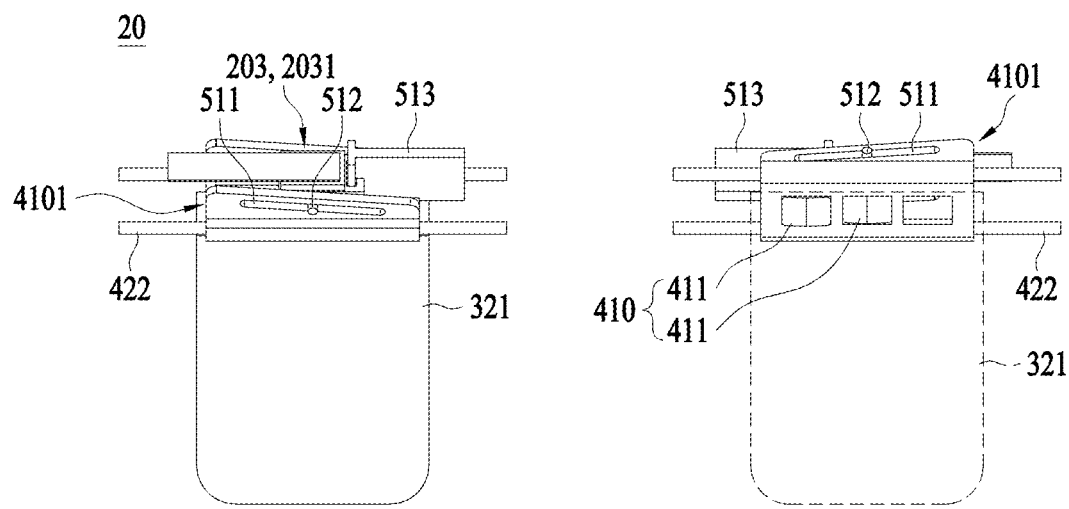
FIGS. 20a-b illustrate a state after coupling some components of an electronic device associated with the present disclosure.
Figure 20:
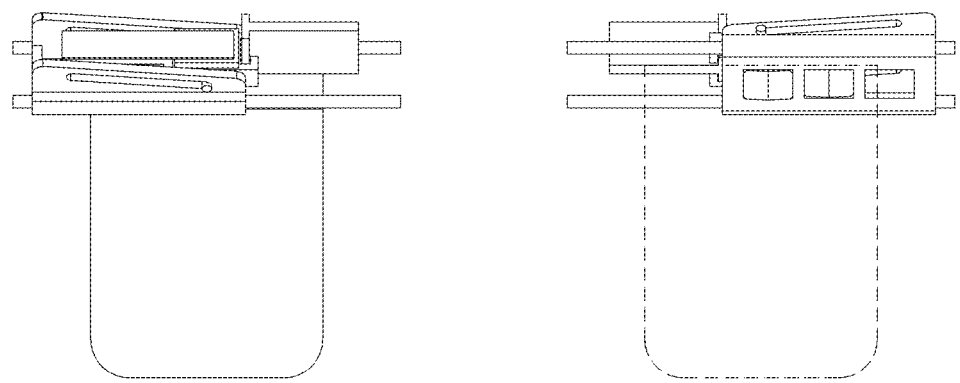

FIGS. 19 and 20A illustrate states before and after coupling some components of an electronic device 20 associated with the present disclosure, and FIGS. 20A and 20B illustrate a rear view and a front view of two states in which plurality of lens members 410 are moved in electronic device 20 associated with the present disclosure, respectively.

As described above, a lens moving assembly 420 moves plurality of lens members 410 such that each lens member 411 of plurality of lens members 410 is selectively positioned at the first point.

Lens moving assembly 420 includes a rail 421 and a guider 422. Rail 421 is formed in a lens case 4101 that mounts plurality of lens members 410, and guider 422 is fixed so as not to move relative to optical element 321 to form a path that rail 421 moves. Guider 422 may be provided in a straight direction parallel to one surface of optical element 321. Guider 422 and rail 421 may be provided as two members parallel to each other in a linear direction for the stable movement of lens case 4101. As rail 421 formed in lens case 4101 moves along guider 422, lens member 411 positioned at the first point is changed.

Rail 421 may move by an external force. The sliding method by the external force has advantages in that it does not require a separate power, it is possible to adjust the augmented reality information output area according to the user's intention regardless of the surrounding situation, and quick switching is possible.

Guider 422 and rail 421 may have a protrusion and a protrusion groove corresponding to lens members 411 respectively to recognize and guide the positioning of each lens member 411 at the first point (not shown).

As plurality of lens members 410 having different refractive indices move, the focal length is also changed, which may provide an unclear image to the user. To solve this problem, the distance from the lens member to pin mirror 312 or from image source panel 203 to pin mirror 312 on the optical path can be changed along with the change of the lens member. In the present embodiment, a panel distance adjusting assembly 500 for changing the distance from image source panel 203 to pin mirror 312 will be described.

Panel distance adjusting assembly 500 includes a slit 511 and a protuberance 512. Slit 511 is provided in lens case 4101 so as to form an inclination with respect to the direction of the guide, that is, the moving direction of lens case 4101, and protuberance 512 is provided in panel case 2031 mounting image source panel 203 and fastened to be movable on slit 511. As lens case 4101 moves, slit 511 also moves. As slit 511 moves, protuberance 512 moves in the direction of the optical path. At this time, a support member 513 prevents panel case 2031 from moving in the moving direction of lens case 4101 while lens case 4101 moves. That is, support member 513 restrains panel case 2031 from moving with respect to the moving direction of lens case 4101. Therefore, the support surface of support member 513 should be formed perpendicular to the longitudinal direction of guider 422.

The degree of inclination of slit 511 depends on the focal length specified by the refractive index of each lens member 411.

Lens moving assembly 420 may move by driving of an actuator instead of an external force. The actuator may be implemented by a motor or solenoid. However, it is not limited thereto and includes all cases in which lens moving assembly 420 is driven by an electromagnetic force based on the generated driving signal.

When the lens member is moved by the actuator, there is an advantage that it can be adjusted without applying an external force.

In addition, when the external illuminance can be sensed, there is an advantage in that the optimum augmented reality information can be provided by automatically positioning lens member 411 that best matches the external illuminance condition. In order to implement this function, electronic device 20 may include an illuminance sensor and a controller. The illuminance sensor measures illuminance around electronic device 20. The controller may control the actuator to correspond to the ambient brightness so that variable lens member 400 is adjusted in a direction in which the region where image light 603 reaches is narrowed if the ambient illuminance measured by the illuminance sensor is high and variable lens member 400 is adjusted to widen the corresponding region if the ambient illuminance measured by the illuminance sensor is low. Without the user's separate adjustment, the higher the ambient illuminance, the higher the brightness of the output augmented reality information, and the lower the ambient illuminance, the lower the brightness of the output augmented reality information.

The above detailed description should not be construed as limiting in all respects but should be considered as illustrative. The scope of the present disclosure should be determined by reasonable interpretation of the appended claims, and all changes within the equivalent scope of the present disclosure are included in the scope of the present disclosure.

Some or other embodiments of the present disclosure described above are not exclusive or distinct from one another. Certain embodiments or other embodiments of the present disclosure described above may be combined or used together in each configuration or function.

For example, it means that A configuration described in certain embodiments and/or drawings and B configuration described in other embodiments and/or drawings may be combined. In other words, even when the combination between the configurations is not described directly, it means that the combination is possible unless clearly stated otherwise.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

The advantageous effects of the electronic device according to the present disclosure will be described below.

According to at least one of the embodiments of the present disclosure, the size of the augmented reality information provided through the electronic device can be adjusted.

Further, according to at least one of the embodiments of the present disclosure, the brightness of the augmented reality information provided through the electronic device may be adjusted.

In addition, according to at least one of the embodiments of the present disclosure, it is possible to adjust the size or brightness of the augmented reality information by a physical method to increase the operation reliability.

Further, according to at least one of the embodiments of the present disclosure, the size or brightness of the augmented reality information is automatically adjusted according to the external environment.

In addition, according to at least one of the embodiments of the present disclosure, an unnecessary region is not generated in the region where the pin mirror is provided on the display.

What is claimed is:

1. An electronic device comprising:
   an optical driving assembly including an image source panel for emitting image light;
   an optical element in which the emitted image light is incident on and reflected;
   a plurality of pin mirrors distributed in a region of the optical element and configured to extend a depth of a field of view; and
   a variable lens member provided at one point of an optical path before the emitted light reaches the plurality of pin mirrors, wherein the variable lens member is configured to narrow or widen an effective region of image light that reaches the plurality of pin mirrors among the region provided with the plurality of pin mirrors by changing a focal length of the variable lens member to adjust a size of an output image of augmented reality information,
   wherein the variable lens member includes:
   a plurality of lens members; and
   a lens moving assembly configured to move the plurality of lens members such that each lens member of the plurality of lens members is selectively positioned at a first point on the optical path reaching the plurality of pin mirrors from the image source panel.

2. The electronic device of claim 1, further comprising a lens case configured to mount the plurality of lens members, wherein the lens moving assembly includes:
   a rail formed in the lens case; and
   a guider fixed to the optical element to form a path along which the guider moves along the rail.

3. The electronic device of claim 2, wherein the guider is provided in a straight direction parallel to one surface of the optical element.

4. The electronic device of claim 3, further comprising:
   a panel case configured to mount the image source panel; and
   a panel distance adjusting assembly configured to move such that a length of the optical path from the panel case to the plurality of pin mirrors becomes different according to a movement of the lens case.

5. The electronic device of claim 4, wherein the panel distance adjusting assembly includes:
   a slit provided in the lens case to form an inclination with respect to a direction of the guider;
   a protuberance provided on the panel case and fastened to be movable on the slit; and
   a support member configured to prevent the panel case from moving in a direction of the movement of the lens case when the lens case moves.

6. The electronic device of claim 1, wherein the lens moving assembly includes an actuator configured to move the plurality of lens members by rotation of a motor or solenoid drive.

7. The electronic device of claim 6, further comprising:
   an illuminance sensor configured to measure ambient illuminance; and
   a controller configured to control the actuator such that the variable lens member is adjusted to narrow the effective region of image light if the ambient illuminance measured by the illuminance sensor is high, and the variable lens member is adjusted to widen the region where the image light reaches if the ambient illuminance measured by the illuminance sensor is low.

8. The electronic device of claim 1,
   wherein the plurality of lens members are each composed of any one of a refractive lens and a diffraction element.

9. The electronic device of claim 1, wherein the variable lens member is a tunable lens including a liquid lens or an electro wetting lens having a variable refractive index.

10. The electronic device of claim 1, wherein the plurality of pin mirrors form a grid pattern, and intersecting band regions among the grid pattern form a reflective region.

11. The electronic device of claim 1, wherein the plurality of pin mirrors form a grid pattern, and regions inside a grid among the grid pattern form a reflective region.

12. The electronic device of claim 1, wherein the region where the plurality of pin mirrors are provided and a maximum region where the image light reaches by the variable lens member coincide with each other.

13. An electronic device comprising:
- an optical driving assembly including an image source panel for emitting image light;
- an optical element in which the emitted image light is incident on and totally reflected;
- a plurality of pin mirrors distributed in a region of the optical element and configured to extend a depth of field; and
- a variable lens member provided at one point of an optical path before reaching the plurality of pin mirrors to vary a region where the image light reaches among the region where the plurality of pin mirrors are provided, wherein the variable lens member includes:

a plurality of lens members; and a lens moving assembly configured to move the plurality of lens members such that each lens member of the plurality of lens members is selectively positioned at a first point on an optical path reaching the plurality of pin mirrors from the image source panel.

* * * * *